United States Patent [19]

Giwer

[11] 3,765,557

[45] Oct. 16, 1973

[54] REINFORCED HIGH PRESSURE TEST VESSEL

[76] Inventor: Matthias M. Giwer, 1201 South Scott Street, Arlington, Va. 22204

[22] Filed: Sept. 20, 1971

[21] Appl. No.: 182,253

Related U.S. Application Data

[63] Continuation-in-part of Ser. No. 853,070, Aug. 26, 1969, abandoned.

[52] U.S. Cl............................ 220/3, 220/71, 220/83
[51] Int. Cl. ...................................................... F25j
[58] Field of Search............................ 220/3, 71, 83

[56] References Cited
UNITED STATES PATENTS

| 2,143,852 | 1/1939 | Anderson | 220/83 UX |
| 2,258,031 | 10/1941 | Pierce | 220/83 UX |
| 2,700,317 | 1/1955 | Lilienfeld | 220/83 UX |
| 2,791,241 | 5/1957 | Reed | 220/3 UX |
| 3,112,234 | 11/1963 | Krupp | 220/3 UX |
| 3,189,510 | 6/1965 | Eldred | 220/3 UX |
| 3,215,576 | 11/1965 | Huff | 220/3 UX |
| 3,240,644 | 3/1966 | Wolff | 220/3 X |
| 3,673,028 | 6/1972 | Pearson | 220/3 X |

Primary Examiner—William T. Dixson, Jr.
Assistant Examiner—James R. Garrett
Attorney—R. S. Sciascia

[57] ABSTRACT

Stress relief is provided in a high pressure test vessel by wrapping a pre-stressed, braided multifilament of interwoven fiber glass filaments coated externally with an epoxy resin about the pressure vessel to reduce the possibility of vessel fatigue failure under cyclic operation.

1 Claim, 2 Drawing Figures

PATENTED OCT 16 1973

3,765,557

INVENTOR.
MATTHIAS M. GIWER

BY
*D. E. Hodges*
ATTORNEY

REINFORCED HIGH PRESSURE TEST VESSEL

CROSS REFERENCES TO RELATED APPLICATIONS

This application is a continuation-in-part of application Ser. No. 853,070 filed Aug. 26, 1969, now abandoned.

The invention described herein may be manufactured and used by or for the Government of the United States of America for governmental purposes without the payment of any royalties thereon or therefor.

BACKGROUND OF THE INVENTION

The present invention relates to pressure test vessels or tanks reinforced or wound with reinforcing filaments. The prior art teaches reinforcing test vessels with single filament windings. Such vessels were originally designed for only one or at most a few stress cycles. When such tanks are used under high pressure conditions, and are subjected to a great number of cyclings, they fail due to the poor stress characteristics and thus create a serious problem. The prior art also teaches the use of bonded multifilaments which also fail prematurely under cyclic stress due to bonding.

SUMMARY

The instant invention overcomes the aforementioned problems and disadvantages of the prior art by combining single filaments into an interwoven or braided multifilament which is capable of withstanding much greater levels of high stress and repeated stress cyclings. The braided multifilament is completely wound about a high pressure test vessel to improve the stress characteristics of said vessel and diminish the possibility of fatigue failure under cyclic operations.

Accordingly, it is an object of the present invention to provide a high pressure test vessel which has improved stress and fatigue characteristics.

A further object is to provide a material that will frictionally absorb cyclic stress.

Other objects and many of the attendant advantages of this invention will be readily appreciated as the invention becomes better understood by reference to the following detailed description when considered in connection with the accompanying drawings wherein:

DESCRIPTION OF THE PREFERRED EMBODIMENT

Figure 1:
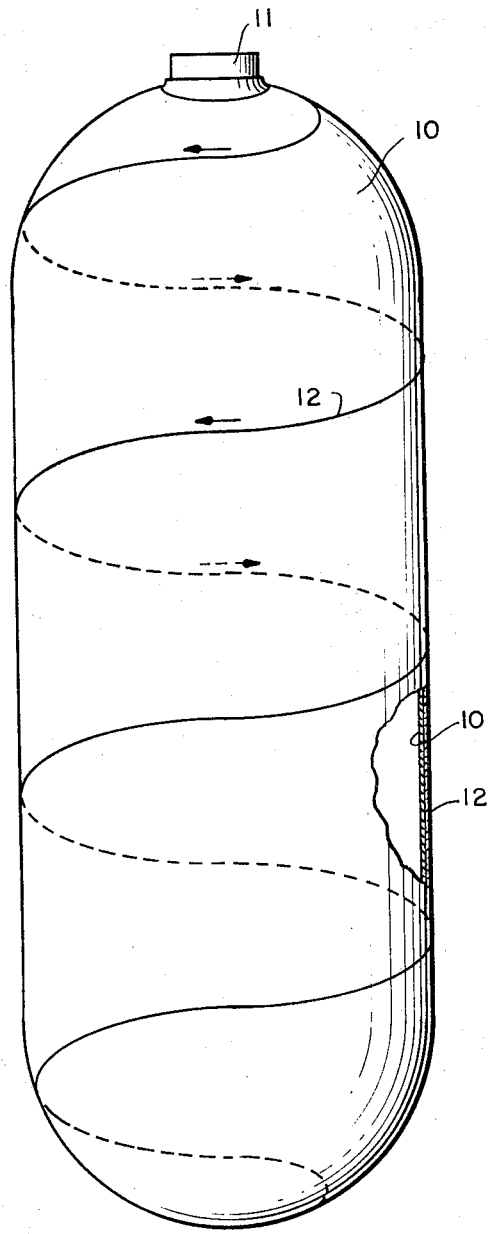
FIG. 1 illustrates a high pressure test vessel wound with a braided multifilament.

In FIG. 1 reference numeral 10 designates a hollow high pressure vessel or tank used, for example, to test and calibrate sonar transducers and hydrophones. By way of example, the test vessel has been shown to be cylindrical in shape but vessels having different shapes could also be employed.

The objects to be tested are inserted into the tank 10 through access port 11. Multifilament windings 12 are wrapped about the tank 10 for reinforcing purposes and, by way of example, may comprise braided fiber glass filaments coated externally with an epoxy resin. The layers of filaments are not bonded to each other. The windings are pre-stressed so as to improve their reinforcing effect and to hold the multifilaments in place while being wrapped about said tank. FIG. 1 is not intended to give the actual configuration of the windings since this may be a complex design in order to accomplish the purpose of keeping a constant stress on the tank.

Figure 2:
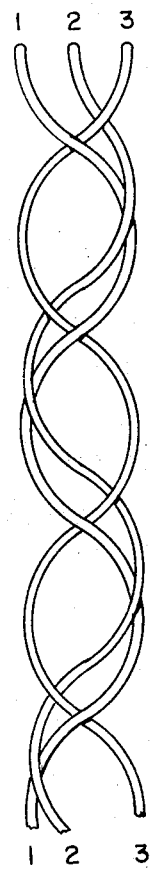
FIG. 2 illustrates a step-by-step procedure for interweaving a multifilament.

FIG. 2 illustrates the procedure for interweaving a number of single filaments into a braided multifilament. Three single filaments were chosen to show in a step-by-step fashion this procedure but certainly more than three single filaments could be interwoven and any method for interweaving the filaments could be employed. In addition the braided multifilament could be produced by interweaving a plurality of multifilaments rather than single filaments thereby forming a large multifilament made up from smaller multifilaments.

DESCRIPTION OF THE OPERATION

In practicing the instant invention, stress relief is accomplished by interweaving several filaments into one braided multifilament. The braided multifilament is then wrapped around a high pressure test vessel for reinforcing purposes and therefore replaces many turns of single filaments. This method can be applied wherever single filaments are presently used for reinforcing pressure vessels.

In an unwoven group of single filaments wound about a high pressure test vessel the filaments most adjacent the vessel would be subjected to the greatest stress caused by the cyclic expansion and contraction of the vessel and consequently this layer of single filaments would be the first to break as the pressures increase toward the pressure limits of the tanks. As the cyclic stress continues this breakage would progress rapidly through the group of single filaments. To combat the problem of cyclic stress the instant invention uses braided multifilaments wherein this breakage effect is greatly reduced because when stress is applied to the braided group the weave is tightened and the shock effect of the stress is taken up by the friction between the filaments. Since the filaments are not bonded to each other they are capable of frictionally relieving stress. Furthermore, since the stress is applied at an angle to the cross section of the filaments, a greater area of the filament is presented to the stress and thus greater overall strength is obtained. In addition part of the stress is absorbed by compressing the filaments together in an elastic deformation of the layers of filaments in the braid.

Therefore, the overall effect of wrapping a woven multifilament around a high pressure test vessel is to improve the reinforcing effect by compensating for the effect of a large number of stress cyclings which is not possible with presently known apparatus.

Obviously many modifications and variations of the present invention are possible in the light of the teachings thereof.

I claim:

1. A reinforced high pressure test vessel which comprises:
    a hollow test vessel containing an access port; and
    a braided prestressed multifilament strand formed of interwoven glass filaments continuously wound around said vessel under tension to form continuous adjacent windings of said multifilament strand for reducing vessel fatigue due to cyclic stress acting on said vessel, said filaments being coated externally with an epoxy resin such that each filament is movably in frictional engagement with respect to each other filament of the multifilament stand.

* * * * *